United States Patent
Kong et al.

(10) Patent No.: US 11,309,801 B2
(45) Date of Patent: Apr. 19, 2022

(54) FLYBACK CONVERTER WITH IMPROVED DYNAMIC LOAD RESPONSE

(71) Applicant: DIALOG SEMICONDUCTOR INC., Campbell, CA (US)

(72) Inventors: Pengju Kong, Campbell, CA (US); Tao Li, Campbell, CA (US); Juyoung Yoon, Campbell, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 16/903,138

(22) Filed: Jun. 16, 2020

(65) Prior Publication Data

US 2020/0412254 A1      Dec. 31, 2020

Related U.S. Application Data

(60) Provisional application No. 62/867,663, filed on Jun. 27, 2019.

(51) Int. Cl.
| | | |
|---|---|---|
| *H02M 3/335* | (2006.01) | |
| *H02M 3/156* | (2006.01) | |
| *H02M 1/00* | (2006.01) | |

(52) U.S. Cl.
CPC ..... *H02M 3/33523* (2013.01); *H02M 3/1566* (2021.05); *H02M 3/33515* (2013.01); *H02M 3/33592* (2013.01); *H02M 1/0025* (2021.05)

(58) Field of Classification Search
CPC ......... H02M 3/33507; H02M 3/33523; H02M 3/33592; H02M 1/0025; H02M 1/0003; H02M 3/1566

USPC ...................................................... 323/21.15
See application file for complete search history.

(56) References Cited

U.S. PATENT DOCUMENTS

| | | | |
|---|---|---|---|
| 7,622,820 B1* | 11/2009 | Prodic ................... | H02M 3/158 307/31 |
| 2003/0035307 A1* | 2/2003 | Matsuura .......... | H02M 3/33576 363/25 |
| 2008/0001085 A1* | 1/2008 | Marshall ............... | H02M 3/157 250/330 |
| 2011/0255311 A1* | 10/2011 | Hsu .................... | H02M 3/33507 363/21.15 |
| 2014/0078789 A1* | 3/2014 | Li ..................... | H02M 3/33507 363/21.15 |
| 2014/0085938 A1* | 3/2014 | Shi .................... | H02M 3/33523 363/21.01 |
| 2014/0132184 A1 | 5/2014 | Gaknoki et al. | |
| 2015/0372603 A1 | 12/2015 | Tang et al. | |
| 2017/0085184 A1 | 3/2017 | Lai | |

FOREIGN PATENT DOCUMENTS

| | | |
|---|---|---|
| JP | 2012/005304 | 1/2012 |
| KR | 10-1415922 | 7/2014 |

* cited by examiner

*Primary Examiner* — Alex Torres-Rivera
(74) *Attorney, Agent, or Firm* — Haynes & Boone, LLP

(57) ABSTRACT

A secondary-side control loop for a flyback converter is provided that generates a secondary-side control signal during normal operation using a compensator. In periods of significant load changes, the compensator is bypassed so that the secondary-side control signal is generated as an open-loop signal.

18 Claims, 5 Drawing Sheets

FLYBACK CONVERTER WITH IMPROVED DYNAMIC LOAD RESPONSE

CROSS REFERENCE TO RELATED APPLICATIONS

The present application claims the benefit of U.S. Provisional Application No. 62/867,663, filed Jun. 27, 2019 and entitled "Flyback Converter With Improved Dynamic Load Response" the contents of which is incorporated by reference herein.

TECHNICAL FIELD

This application relates to flyback converters, and more particularly to flyback converters with improved dynamic load response.

BACKGROUND

Isolated switching power converters such as flyback converters are commonly used in both AC-to-DC and DC-to-DC conversion with galvanic isolation between an input power source and one or more outputs. A flyback converter is a buck-boost converter with the inductor split to form a transformer, allowing for both the scaling of the output voltage(s) and primary-to-secondary isolation. A controller in the flyback converter controls a cycling of a power switch transistor to regulate the output voltage. FIG. 1 illustrates a prior art flyback converter, which includes a power switch transistor S1 coupled to the primary winding T1 of a transformer T. The ON and OFF cycles of power switch transistor S1 are controlled by a primary-side controller U1. When the primary-side controller U1 cycles on the power switch transistor, an input voltage V_IN on an input rail connected to the primary winding T1 causes a primary winding current to flow through the primary winding T1. The peak primary winding current at an end of an on-time for the power switch transistor S1 depends upon the input voltage V_IN, a magnetizing inductance for the transformer T, and the on-time for power switch transistor S1. While power switch transistor S1 conducts, an output diode D1 coupled to a secondary winding of T2 of the transformer prevents the secondary winding current from flowing. Alternatively, output diode D1 may be replaced by a synchronous rectifier switch transistor.

When the power switch transistor S1 switches off, the stored magnetic energy in the transformer causes the secondary winding current to flow and charge an output capacitor C1 with an output voltage (V_OUT). A secondary-side controller U2 senses the difference between the output voltage and a pre-set reference voltage and generates a control signal based on this difference. This information needs to be transferred to the primary-side controller U1, while maintaining galvanic isolation. An optoisolator is commonly used for this application.

A feedback loop for the SR flyback converter of FIG. 1 is shown in FIG. 2. The secondary-side controller includes an error amplifier (EA) that compares the output voltage V_OUT to a reference voltage V_REF to generate an error signal. A compensator with integration filters and smooths the error signal to form the control signal that is driven into the optoisolator. On the primary-side of the galvanic isolation provided by the transformer, a filter is placed at the output of the optocoupler to smooth the received control signal. Alternatively, the filtering may be produced by the parasitic effects of the optocoupler itself. The primary-side controller controls the cycling of the power switch transistor responsive to the filtered received control signal. In FIG. 2, the transformer and the power switch transistor as well as any associated components such as the output capacitor C1 are represented symbolically by a power circuit. The resulting regulation of the output voltage through the feedback loop regulates the output voltage to equal a desired value as set by the reference voltage. However, the filtering at the output of the optocoupler reduces the feedback loop bandwidth and delays the received control signal response. This delay lowers the dynamic load response speed, which causes undesirable overshoot and undershoot of the output voltage in response to transient load changes.

Accordingly, there is a need in the art for flyback converters with secondary-side output voltage sensing and improved dynamic response.

SUMMARY

In accordance with a first aspect of the disclosure, a secondary-side controller for a flyback converter with secondary-side regulation (SSR) is provided that includes: an error amplifier configured to generate an error signal responsive to a difference between an output voltage and a reference voltage; a compensator configured to compensate the error signal to produce a closed-loop control signal; an output state monitor configured to determine whether a threshold load change has occurred for the flyback converter, wherein the secondary-side controller is configured to drive an optocoupler with the closed-loop control signal in response to an absence of the threshold load change and to drive the optocoupler with an open-loop control signal in response to the threshold load change.

In accordance with a second aspect of the disclosure, a method of secondary-side regulation of a flyback converter is provided that includes: during periods in which a load change for the flyback converter is less than a threshold load change: comparing an output voltage to a reference voltage to generate an error signal and processing the error signal in a compensator to produce a closed-loop control signal in a secondary-side controller and transmitting the closed-loop control signal to a primary-side controller; and during periods in which the load change for the flyback converter is greater than the threshold load change: generating an open-loop control signal that does not involve a use of the compensator in the secondary-side controller and transmitting the open-loop control signal to the primary-side controller.

In accordance with a third aspect of the disclosure, a flyback converter with secondary-side regulation is provided that includes: a secondary-side controller configured to generate an open-loop control signal during an open-loop period in response to a load change for the flyback converter being greater than a threshold level and configured to generate a closed-loop control signal after an expiration of the open-loop period, the secondary-side controller including a multiplexer configured to select between the open-loop control signal and the closed-loop control signal to provide a selected control signal; an optoisolator configured to transmit the selected control signal; and a primary-side controller configured to control a cycling of a power switch transistor in response to a receipt of the selected control signal from the optoisolator.

These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
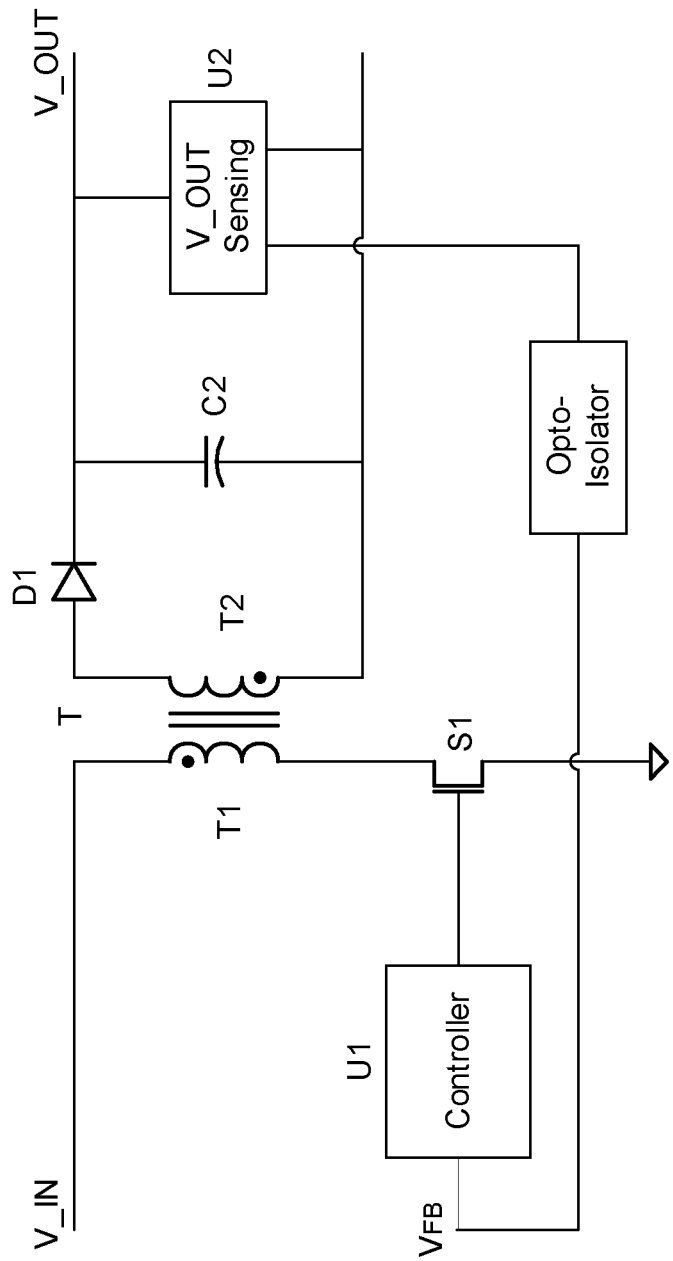
FIG. 1 illustrates an SSR conventional flyback converter with secondary-side output voltage sensing.
Figure 3A:
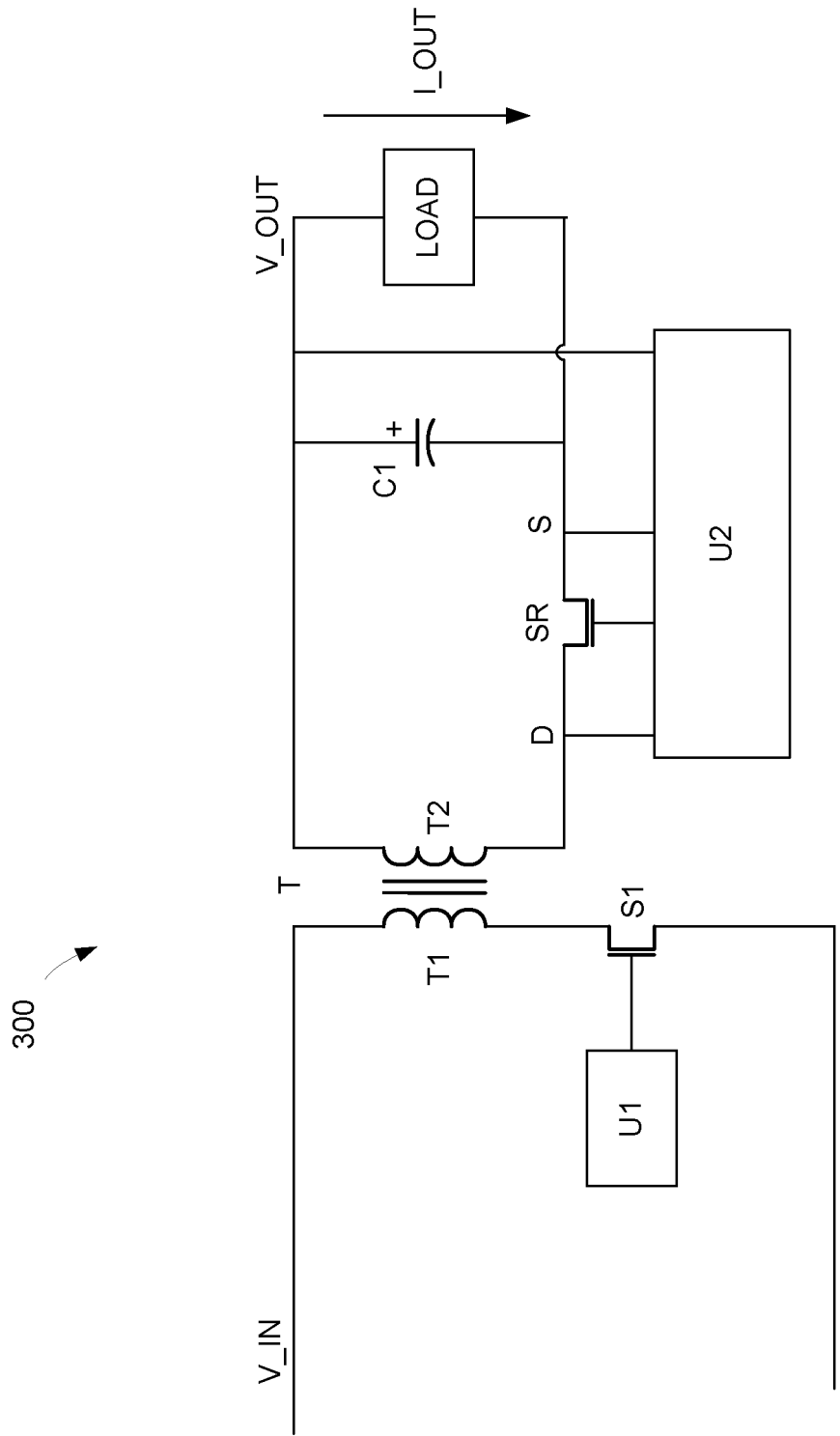
FIG. 3A illustrates an SSR flyback converter with improved dynamic response in accordance with an aspect of the disclosure.

An SSR flyback converter 300 with improved dynamic response is shown in FIG. 3A. A number of features for SSR flyback converter 300 are as discussed for the SSR flyback converter of FIG. 1. For example, SSR flyback converter 300 includes the primary-side controller U1 that controls the ON and OFF cycles of the power switch transistor S1 to regulate the output voltage V_OUT. While the power switch transistor S1 conducts, the secondary-side controller U2 maintains a synchronous rectifier (SR) switch transistor off to prevent a secondary winding current from flowing in the secondary winding T2 of the transformer T. When the power switch transistor S1 switches off, the stored magnetic energy in the transformer T causes the secondary winding current to flow and charge the output capacitor C1 with the output voltage (V_OUT) to power a load with an output current (I_OUT). A peak primary winding current through the primary winding T1 depends upon an input voltage (V_IN), a magnetizing inductance for the transformer T, and the on-time for power switch transistor S1.

Secondary-side controller U2 includes a terminal to sense a drain voltage at a drain D of the SR switch transistor. Similarly, secondary-side controller U2 includes a terminal to sense a source voltage at a source S of the SR switch transistor. The source voltage is a ground for the secondary-side controller such that the drain voltage of the SR switch transistor is also its drain-to-source voltage. To sense when the power switch transistor S1 is on or off, secondary-side controller U2 compares the drain-to-source voltage for the SR switch transistor to a corresponding threshold voltage as is known in the synchronous rectification arts. The secondary-side controller U2 also includes a terminal for sensing the output voltage so that the error signal may be generated.

To provide improved dynamic response, the secondary-side controller U2 is configured to generate the control signal using a feedback loop or in an open-loop mode of operation depending upon the load. If the application of a load exceeds a threshold level, the secondary-side controller U2 generates the control signal in the open-loop mode of operation. In contrast, if the load change does not meet this threshold level, the secondary-side controller U2 generates the control signal in a closed-loop mode of operation.

Figure 2:
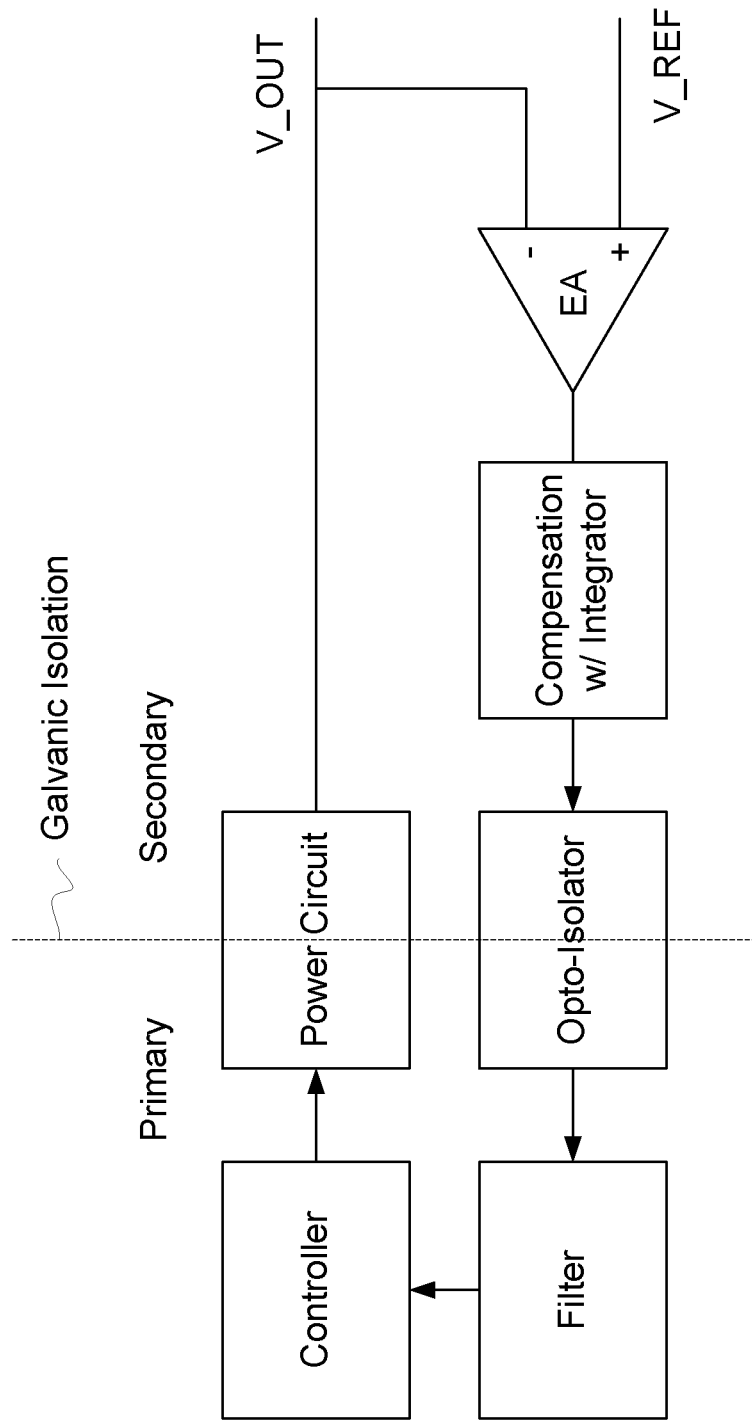
FIG. 2 illustrates a feedback loop for the conventional SSR flyback converter of FIG. 1.
Figure 3B:
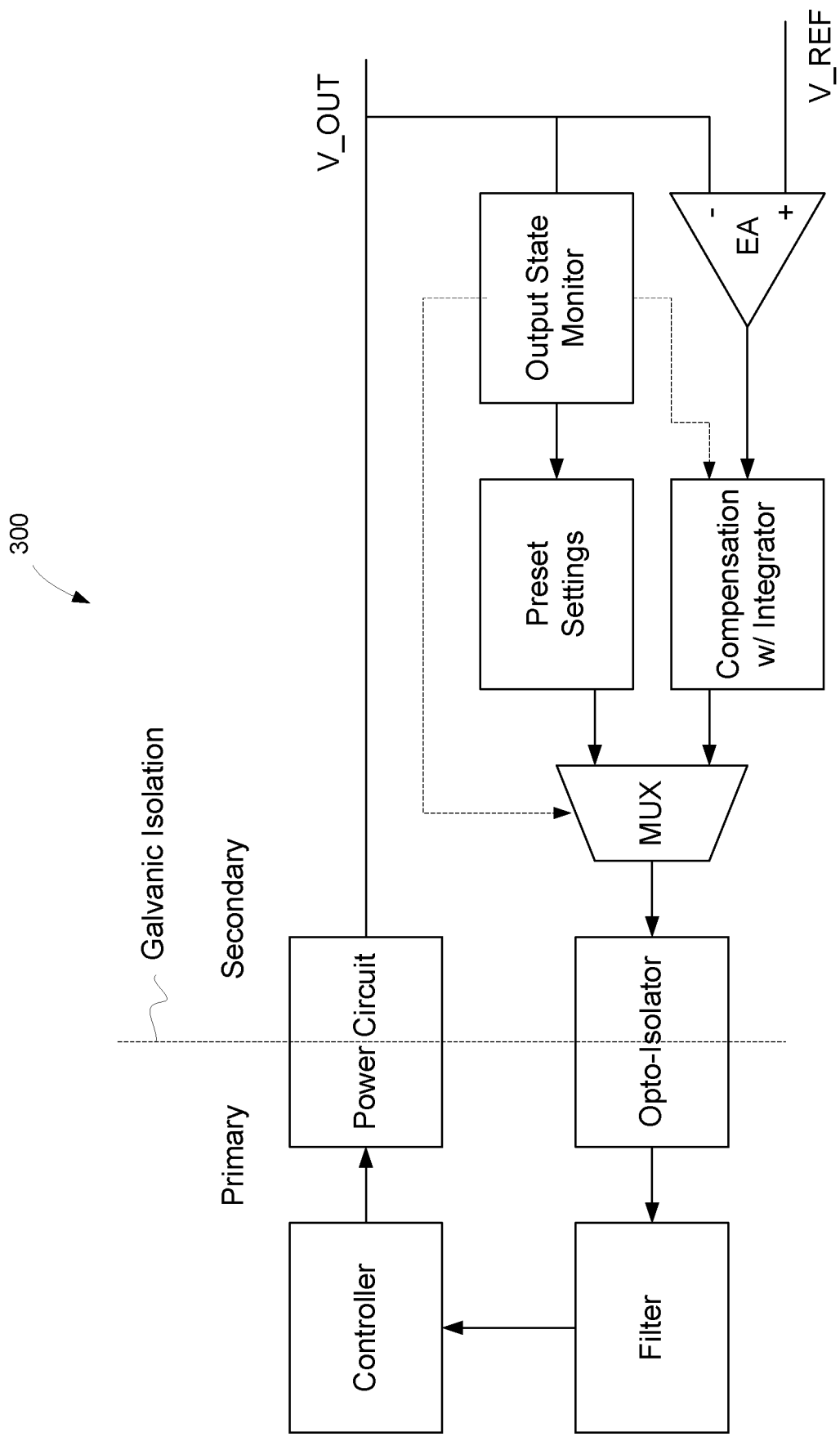
FIG. 3B illustrates a control loop for the SSR flyback converter of FIG. 3A in accordance with an aspect of the disclosure.

The closed-loop mode of operation is as discussed with regard to FIG. 2. In particular, the conventional feedback loop discussed with regard to FIG. 2 is modified as shown in FIG. 3B for SSR flyback converter 300 to increase the dynamic response speed to transient load changes. During the closed-loop mode of operation (no significant load transients), the secondary-side error amplifier (EA) generates an error signal responsive to a difference between the output voltage (V_OUT) and the reference voltage (V_REF). A compensator and integrator compensates and integrates the error signal such as with proportional-integral-derivative (PID) control to produce a closed-loop control signal that is selected for by a multiplexer (MUX) to drive the optoisolator. A filter filters the received control signal from the optoisolator so that a primary-side controller may control the cycling of a power switch in the power circuit accordingly. In FIG. 3B, the transformer and the power switch transistor as well as any associated components such as the output capacitor C1 are represented symbolically by a power circuit as discussed with regard to FIG. 2.

It may thus be appreciated that other than the inclusion of the multiplexer, the feedback loop for SSR flyback converter 300 in the closed-loop mode of operation operates as discussed with regard to the conventional feedback loop of FIG. 2. To detect whether the transient load change satisfies the threshold level, the secondary-side controller U2 includes an output state monitor that monitors whether a load transient (either from an increase in the load or the decrease in the load) is sufficiently large. If the load transient is sufficiently large, the output state monitor drives a preset (open-loop) control signal as represented by the preset settings module to present an open-loop control signal to the multiplexer. For example, the preset settings module may comprise a lookup table for mapping a specific output voltage change into an open-loop control signal. The output state monitor also controls the selection by the multiplexer so that the multiplexer selects for the open-loop control signal in response to the threshold change. In this fashion, the received control signal for the primary-side controller may be quickly adjusted in response to the threshold change in the output voltage despite the filter delay.

Note that a dynamic load change may be caused either by the sudden application of a load or the sudden removal of a load. The output voltage will sag below a first threshold level in response to sufficient application of the load. Similarly, the output voltage will rise above a second threshold level in response to a sudden removal of the load. The output state monitor responds to both conditions by invoking an open-loop generation of the control signal. The open-loop value of the control signal depends upon the implementation. For example, in one embodiment, the control signal is set by the output state monitor to a maximum amount in response to a threshold application of the load. In such an embodiment, the control signal is increased in response to an increase in the load. But in alternative embodiments, the control signal is decreased in response to an increase in the load. In such embodiments, the control signal is set to a minimum value by the output state monitor in response to a threshold increase in the load. The setting of the control signal in response to the threshold removal of the load is of course the opposite of the setting in response to the threshold application of the load. In embodiments in which the control signal increased in response to increases in the load, the output state monitor sets the control signal to a minimum value in response to the detection of a threshold removal of the load. Conversely, for embodiments in which the control signal is decreased in response to increases in the load, the output state monitor sets the control signal to a maximum value in response to the detection of the threshold removal of the load. The setting of the control signal by the output state monitor occurs through the preset settings module.

Should the output state monitor detect a threshold increase, the output state monitor may also command the compensator to adjusts its poles, zeroes, or gains in its frequency response so that the compensator has a temporary increase in its response bandwidth. When the multiplexer finally selects again for the closed-loop control signal as generated by the compensator after a termination of the open-loop mode, the compensator may thus quickly react to the transient response due to its frequency response adjustment. The transient period of time during which the multiplexer selects for the open-loop control signal may be fixed or may be made adaptive with respect to the magnitude of the output voltage change. For example, the output state monitor may have several thresholds with regard to detecting the application of the load. Depending upon the threshold level, different amounts of load transients may be detected by the output state monitor. The open-loop mode may also be referred to as a bypass mode since the compensator is bypassed when the open-loop mode is active.

Figure 4:
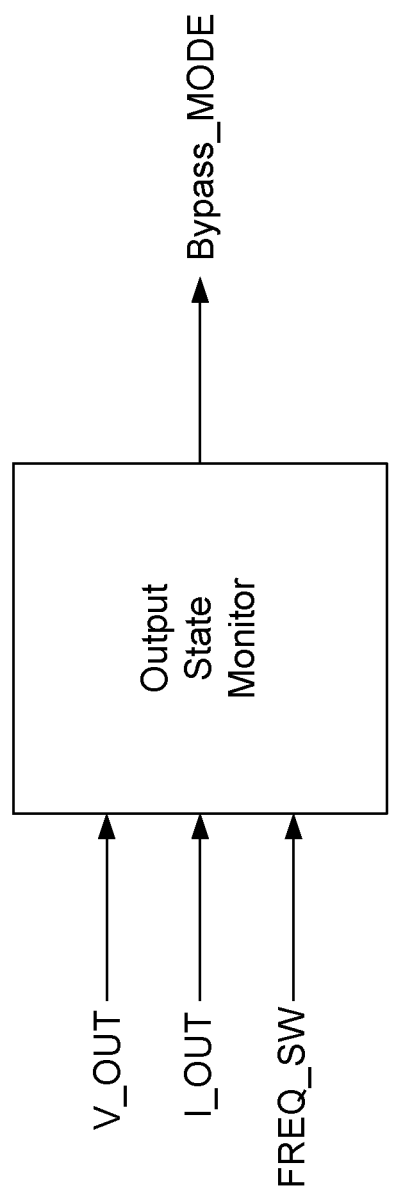
FIG. 4 illustrates some example input signals for the output state monitor in the improved control loop of FIG. 3B.

The output state monitor may respond to a number of different factors with regard to selecting for the open-loop control mode. For example, as shown in FIG. 4, the output state monitor may use the rate of change for the output voltage (V_OUT), a rate of change for the output current (I_OUT), the magnitude of the output voltage, the switching frequency (SW_FREQ) of the power switch transistor S1, or any combination of these factors to select for the bypass mode of operation. For example, the output state monitor may compare the output voltage to a corresponding threshold voltage to determine whether the output voltage has changed by a threshold amount (either positive or negative) due to a transient change in the load. To sense the output current, the output state monitor may sense the voltage across a sense resistor (not illustrated) connected between the source of the SR switch transistor and a ground output terminal for the SSR flyback converter 300. The output state monitor may compare these various factors to corresponding thresholds to determine whether a load transient of sufficient magnitude has occurred.

With regard to reverting back to closed-loop control from the bypass mode, the output state monitor may use a watch dog timer that establishes a minimum active time for the bypass mode. Furthermore, the watch dog timer can be adaptive based on the severity of the transient condition that has been detected. Alternatively, it may monitor whether the output voltage has stabilized as an indication to return to regular closed-loop operation. The switching frequency may also be used as the criterion for this transition. As discussed earlier, the output state monitor may also adjust the dynamic response speed of the compensator. For example, such closed-loop adjustments may be performed for less significant transient load changes in which the bypass mode is not invoked.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A secondary-side controller for a flyback converter with secondary-side regulation, comprising:
    an error amplifier configured to generate an error signal responsive to a difference between an output voltage and a reference voltage;
    a compensator configured to compensate the error signal to produce a closed-loop control signal;
    an output state monitor configured to determine whether a threshold load change has occurred for the flyback converter, wherein the secondary-side controller is configured to drive an optocoupler with the closed-loop control signal in response to an absence of the threshold load change and to drive the optocoupler with an open-loop control signal in response to the threshold load change; and
    a multiplexer configured to select between the open-loop control signal and the closed-loop control signal to provide a selected control signal for driving the optocoupler.

2. The secondary-side controller of claim 1, wherein the output state monitor is configured to determine the threshold load change using a rate of change for an output voltage.

3. The secondary-side controller of claim 1, wherein the output state monitor is configured to determine the threshold load change using a rate of change for an output current.

4. The secondary-side controller of claim 1, wherein the output state monitor is configured to transition from the drive of the optocoupler with the open-loop control signal to again drive the optocoupler with the closed-loop control signal responsive to a threshold change in a switching frequency for a power switch transistor.

5. The secondary-side controller of claim 1, wherein the secondary-side controller is further configured to increase a response speed for the compensator in response to the threshold load change.

6. The secondary-side controller of claim 1, further comprising:
    a lookup table configured to generate the open-loop control signal.

7. The secondary-side controller of claim 1, wherein the output state monitor is further configured to control the multiplexer to select for the open-loop control signal in response to the threshold load change and to select for the closed-loop control signal in response to the absence of the threshold load change.

8. A method of secondary-side regulation of a flyback converter, comprising:
    during periods in which a load change for the flyback converter is less than a threshold load change: comparing an output voltage to a reference voltage to generate an error signal and processing the error signal in a compensator to produce a closed-loop control signal in a secondary-side controller and transmitting the closed-loop control signal to a primary-side controller; and
    during periods in which the load change for the flyback converter is greater than the threshold load change: generating an open-loop control signal that does not involve a use of the compensator in the secondary-side controller and transmitting the open-loop control signal to the primary-side controller.

9. The method of claim 8, further comprising:
    detecting whether the load change for the flyback converter is greater than the threshold load change by using a rate of change for the output voltage.

10. The method of claim 8, further comprising:
    detecting whether the load change for the flyback converter is greater than the threshold load change by using a rate of change for an output current.

11. The method of claim 8, further comprising:
switching from a generation of the open-loop control signal to a generation of the closed-loop control signal responsive to a change in a switching frequency of a power switch transistor.

12. The method of claim 8, further comprising:
adjusting the cycling of a power switch transistor responsive to a receipt of the open-loop control signal at the primary-side controller.

13. The method of claim 8, wherein the threshold load change is a threshold load change for an application of a load.

14. The method of claim 8, wherein the threshold load change is a threshold load change for a removal of a load.

15. A flyback converter with secondary-side regulation, comprising:
a secondary-side controller configured to generate an open-loop control signal during an open-loop period in response to a load change for the flyback converter being greater than a threshold level and configured to generate a closed-loop control signal after an expiration of the open-loop period, the secondary-side controller including a multiplexer configured to select between the open-loop control signal and the closed-loop control signal to provide a selected control signal;
an optoisolator configured to transmit the selected control signal; and
a primary-side controller configured to control a cycling of a power switch transistor in response to a receipt of the selected control signal from the optoisolator.

16. The flyback converter of claim 15, wherein the secondary-side controller includes:
an output state monitor configured to determine whether the load change is greater than the threshold level.

17. The flyback converter of claim 16, wherein the threshold level is threshold level for an output current change.

18. The flyback converter of claim 16, wherein the threshold level is a threshold level for an output voltage change.

* * * * *